J. OSTER.
HOUSE HEATING SYSTEM.
APPLICATION FILED NOV. 2, 1921.
1,426,004.
Patented Aug. 15, 1922
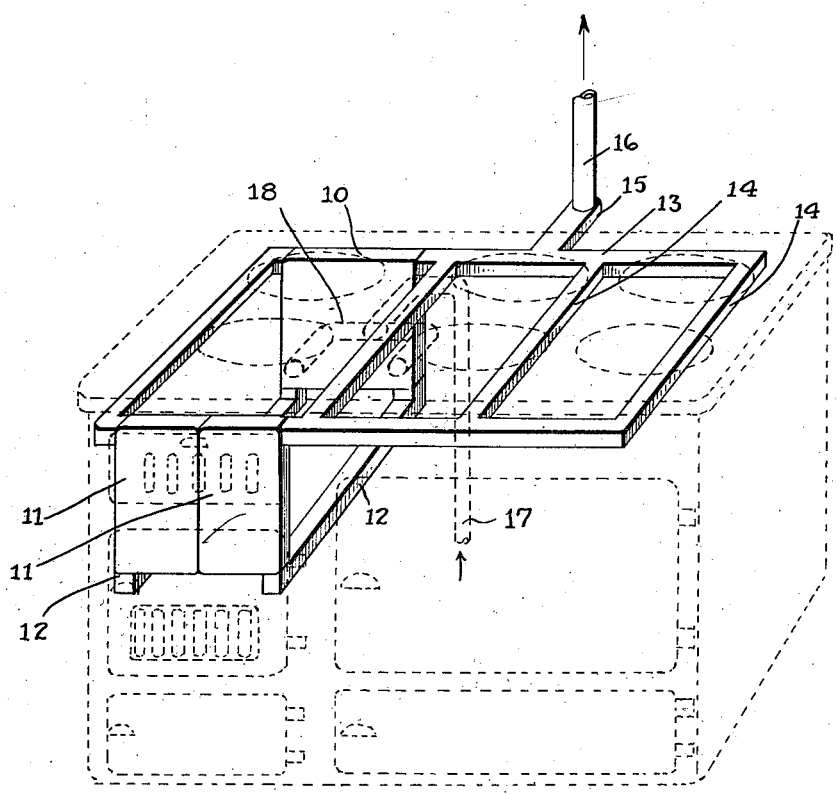
INVENTOR,
Joseph Oster,
BY
W. B. Hutchinson
ATTORNEY

UNITED STATES PATENT OFFICE.

JOSEPH OSTER, OF LOCUST VALLEY, NEW YORK.

HOUSEHEATING SYSTEM.

1,426,004.   Specification of Letters Patent.   Patented Aug. 15, 1922.

Application filed November 2, 1921. Serial No. 512,193.

*To all whom it may concern:*

Be it known that I, JOSEPH OSTER, a citizen of the United States, and a resident of Locust Valley, Nassau County, New York, have invented a new and useful Improvement in Househeating Systems, of which the following is a full, clear, and exact description.

My invention relates to improvements in house heating systems, and particularly to the system which is adapted for use in heating comparatively small houses, and in connection with a kitchen range. When a hot fire is maintained in a kitchen range, the kitchen is too warm, and much of the heat energy of the fire is wasted. My invention is intended to utilize this waste heat for heating other rooms of a house, and in such a way that practically all the heat generated in the range will be used for some good purpose. Obviously there is not heat enough in a range to heat a large house, but the heat can be utilized for heating comparatively small houses.

My invention is intended to produce a simple and inexpensive water heating attachment which can be applied to a kitchen range so as to not interfere with the ordinary water-back, and which has a water heating grid lying flat in the upper part of the range, the whole being disposed so as to utilize the excess heat to warm the water and enable it to be distributed through radiators or other heating means at points distant from the range. All of which will be better understood from the description which follows.

Reference is to be had to the accompanying drawings forming a part of this specification, in which similar reference characters indicate corresponding parts in all the views.

The figure is a perspective view of the hot water heating part of my system, showing the same applied to a range, the latter being outlined in dotted lines.

The drawings are shown by way of example, and as illustrated the hot water part of the apparatus can be easily applied to the fire-box of a range, and moreover it will not interfere with the ordinary water-back which is used for heating water for washing, etc. I prefer to make the heating part in two headers 10 and 11 which fit nicely in opposite end portions of the fire-box, as shown in the drawing, and the header 11 is preferably made in two parts to better facilitate construction, application, and circulation.

The header members 11 connect with the header 10 on the under side by cross pipes 12 which lie next the grate preferably near the lower corners of the fire box, and extending rearwardly from the upper parts of the two headers is a hollow grid comprising the side members 13 and the cross members 14, there being any desired number of these cross members. It will be seen that this grid will lie in the upper part of the stove between the top and the oven top, and if desired this space can be made a little larger in the range to accommodate the grid without choking the draft of the range. In the drawing I have shown the parts 12, 13 and 14 as rectangular, as this gives a larger surface and capacity, and they can be readily cast.

Obviously the circulation pipes might connect in many ways without affecting the invention. As shown I have one member 13 provided with a hollow offset 15 in which the direct water pipe 16 connects, and the return pipe 17 connects preferably through a U pipe 18 with the lower portions of the header 10. Obviously the rooms to be heated can be provided with any usual or preferred form of radiators, which can be connected in the customary or any preferred manner with the pipes 16 and 17.

It will be seen that this apparatus can be easily applied to arrange without interfering with the ordinary water-back, and that the circulation will pass from the upper parts of the apparatus, that is from the headers 10 and 11 and the grid 13 through the pipe 16, the circulation system, and back through the pipe 17 to the lower and cooler part of the apparatus. Thus I provide for a natural and perfect circulation of water, and it will be seen that the range can be used for its ordinary cooking purposes as well as if the apparatus were not installed.

I claim:—

1. A water heating attachment for ranges, comprising opposed headers shaped to fit in the end portions of the range fire box, cross pipes connecting the lower portions of the headers and disposed near the corners of the fire box, a rearwardly extending grid adapted to lie flat in the top part of the range and connecting with the upper portions of the headers, said grid comprising side pipes extending along the side portions of the stove top and cross pipes connecting said side pipes and circulation pipes connected with the grid and one of the headers.

2. A water heating attachment for ranges, comprising opposed headers shaped to fit the end portions of the fire box and extending to the top thereof, cross pipes connecting the lower parts of the headers, a flat grid adapted to lie in the top part of the range and connected with and in the same plane as the top portions of the headers, and circulation pipes connected respectively to the grid and one of the headers.

3. A water heating attachment for ranges comprising a header adapted to fit in one end of the range fire-box, a two-part header adapted to fit in the opposite end of the said fire box, cross pipes connecting the parts of the two part header with the single header, said pipes being disposed near the lower corners of the fire box, a hollow grid lying in the top part of the range and connected with the end headers of the fire box, and circulation pipes connecting with the grid and with the lower part of one of the headers.

JOSEPH OSTER.

Witnesses:—
ALBERT JOSEPH DILG,
GUSTAV H. BECKMEIER.